United States Patent [19]

Golden et al.

[11] Patent Number: 5,587,422
[45] Date of Patent: Dec. 24, 1996

[54] SINGLE PHASE SOLIDS CONTAINING METALLOPLOYMERS

[75] Inventors: Josh H. Golden, Stamford, Conn.; Francis J. DiSalvo; Jean M. J. Frechet, both of Ithaca, N.Y.

[73] Assignee: Cornell Research Foundation, Inc., Ithaca, N.Y.

[21] Appl. No.: 471,838

[22] Filed: Jun. 7, 1995

Related U.S. Application Data

[63] Continuation-in-part of Ser. No. 245,574, May 18, 1994, abandoned.

[51] Int. Cl.⁶ .................................. C08K 3/10; C08K 3/34
[52] U.S. Cl. .......................... 524/779; 524/780; 524/789; 252/308; 252/315.2
[58] Field of Search .................................. 252/308, 364; 106/1.12, 1.25; 524/779, 780, 789

[56] References Cited

U.S. PATENT DOCUMENTS

| | | | |
|---|---|---|---|
| 3,427,264 | 2/1966 | Forster et al. | 524/439 |
| 3,891,594 | 6/1975 | Taylor | 524/783 |
| 4,172,101 | 10/1979 | Getson | 528/31 |
| 4,251,576 | 2/1981 | Osborn et al. | 524/789 |
| 4,297,267 | 10/1981 | Leatherman | 524/780 |
| 4,471,078 | 9/1984 | Ida | 524/780 |
| 4,546,145 | 10/1985 | Kishida et al. | 524/779 |
| 4,871,790 | 10/1989 | Lamanna et al. | 524/779 |
| 4,948,739 | 8/1990 | Charmot | 524/785 |
| 5,264,278 | 11/1993 | Mazurek et al. | 525/477 |
| 5,470,910 | 11/1995 | Spanhel et al. | 524/779 |

*Primary Examiner*—Tae Yoon
*Attorney, Agent, or Firm*—Bruce F. Jacobs; Diderico Van Eyl

[57] ABSTRACT

Single phase solid materials are produced by dissolving a metallopolymer, preferably of $(LiMo_3Se_3)_n$, in a polymerizable organic solvent, preferably vinylene carbonate, homogeneously dispersing the metallopolymer, and then polymerizing the solvent.

10 Claims, No Drawings

SINGLE PHASE SOLIDS CONTAINING METALLOPLOYMERS

CROSS-REFERENCE TO RELATED APPLICATION

This application is a continuation-in-part of U.S. Ser. No. 08/245,574, filed May 18, 1994, now abandoned.

BACKGROUND OF THE INVENTION

The present invention is broadly directed to the preparation of mixed organic-inorganic single phase solids from a polymerizable organic compound which is a solvent for a metallopolymer. More specifically, this invention produces near monodisperse nano-size metallopolymers in an organic polymer host by polymerization with a solubilizing monomer-solvent medium. As used herein, a "metallopolymer" is an inorganic macromolecular complex having only metal-metal bonds in a repeat unit. Preferably the metallopolymer after dissolution has a minimum length of about 15 Å. As such, a metallopolymer generally displays a nanowire or a molecular wire morphology. A metallopolymer is to be distinguished from a metal cluster, a cage compound in which metal atoms are held together by bridging ligands, typically organic, and from simple organometalic compounds not containing metal-metal bonds. "Single phase" refers to a substantially homogeneous dispersion of dissolved portions of the metallopolymers dispersed throughout a matrix of a polymerized organic solvent. The presence of a single phase may be confirmed by conventional techniques such as scanning transmission electron microscopy (STEM) and scanning electron microscope (SEM) analyses.

Substantial research efforts are being focused on the design and fabrication of organic materials containing metallopolymers because of expected applications of such materials in the fields of nanoscale electronic, optical, and mechanical devices. Useful properties exhibited by these materials include anisotropic conductivity, magnetism, size dependent light absorption, and dichroism. A major problem in the preparation of such materials is the prevention of both phase separation and aggregation of the metallopolymers within a host matrix. Nanofibrillar structures have been restricted to the porous confines of a template host from which they have been prepared. In some cases they may be extracted in the form of multifibrillar arrays. (Whitney et al., *Science*, 261, 1316–19 (1993)) Strategies attempted heretofore to control aggregation, size and morphology have included casting molten metals in zeolite cavities and tensile drawing of bulk metals. Neither of these have enabled the preparation of the products of this invention.

Vassiliou et al., (*Preparation of a Novel Polymer Blend of Poly(ethylene oxide) and the Inorganic Polymer $(Mo_3Se_3^-)_\infty$: Infrared Absorption of Thin Films*, 2 Chem. Mater. (1990) pp. 738–741) teach the dispersion of inorganic polymers in an organic solvent which is then evaporated to prepare multi-phase polymer blends of $LiMo_3Se_3$ and polyethylene oxide. Vassilou, however, mixes its metal polymers in polymer solutions, not in monomer solutions with subsequent polymerization as in the present invention. Similarly, U.S. Pat. No. 4,546,145 teaches the dispersion of an inorganic substance into a non-solvent monomer, i.e. one having no capacity to function as a solvent whatsoever, to prepare multiphase materials. U.S. Pat. No. 4,871,790 discloses the use of a non-polymerizable organic liquid to prepare a multiphase material.

U.S. Pat. No. 4,297,267 (Leatherman) discloses dissolving a simple hexavalent chromium compound in a liquid diol bis(allyl carbonate) polymerizable solvent to form after polymerization of the liquid diol optically clear colored lenses and the like. Leatherman is limited to the use of non-polymeric hexavalent chromium compounds. U.S. Pat. No. 4,471,078 (Ida) discloses the preparation of selective light absorptive methacrylate resins by adding simple low molecular weight neodynium compounds (about 573 daltons) to a resin-forming methacrylic starting material and then polymerizing the methacrylic monomer. Neither patent discloses anything about metallopolymers which have metal to metal bonds in the repeat unit.

U.S. Pat. No. 4,172,101 (Getson) discloses the preparation of modified organopolysiloxane compositions from organic monomers in the presence of vinyl containing organo polysiloxanes. Similarly, U.S. Pat. No. 5,264,278 (Mazurek) discloses combining a silicone polymer with a polymerizable organic monomer and then polymerizing the mixture into an adhesive layer. Neither of the polymers is a metallopolymer.

Single phase solids with homogeneously distributed metallopolymers have been found to exhibit unexpected properties that have not been found in conventional materials. The polymer host matrix provides sheathing for the metal "wires" and thus protection from environmental degradation while the metal wires enable the composite final product to be useful in optical and electronic environments, especially on the quantum level, which could lead to new nanoscale devices, antistatic coatings, and light polarizers.

Accordingly, it is an object of the present invention to prepare solutions of polymerizable organic solvents and metallopolymers having metal to metal bonds in each repeat unit.

It is a further object to polymerize the solutions so as to prepare single phase solid materials which contain said metallopolymers homogeneously mixed throughout an organic polymer formed in situ from the polymerizable organic solvent.

SUMMARY OF THE INVENTION

The present invention is directed to a solution of metallopolymer in a polymerizable organic solvent, wherein the metallopolymer is dissolved in the solvent. The invention is further directed to a single phase solid having a substantially homogenous polymer dispersion of a dissolved metallopolymer throughout a matrix of a polymerized organic solvent, wherein the metallopolymer is dissolved in the polymerizable organic solvent prior to polymerization. The solution and the single phase solid are formed, in part, from a metallopolymer having a high solvation energy and a polymerizable organic solvent that by itself is capable of dissolving the metallopolymer. The polymerizable organic solvent and the dissolved metallopolymer are mixed so as to form a homogeneous solution. Thereafter, the polymerizable organic solvent is rapidly polymerized to form a single phase solid containing the dissolved metallopolymer.

DETAILED DESCRIPTION OF THE INVENTION

A suitable metallopolymer is an inorganic polymer having metal-metal bonds in its repeat unit and having a high solvation energy to drive the dissolution of the metallopolymer in the polymerizable organic solvent. As such, lithium metallopolymers are especially preferred due to the lithium cation's capacity to complex and thus chemically interact with polar solvent-monomers. Examples of suitable lithium-containing metallopolymers include: lithium tantalum silicon telluride $(LiTa_4SiTe_4)_n$ and lithium molybdenum selenide, $LiMo_3Se_3$. A particular class of metallopolymers found to produce single phase solids with desirable properties are those containing molybdenum, particularly those of the general formula $(LiMo_3X_3)_n$ and X is selenium or sulfur. The metallopolymers may be prepared by methods such as those described in Vassiliou et al, 2 Chem. Mater. (1990) pp. 738–741. Preferably the metallopolymers will dissolve into discrete units at least about 15, more preferably at least about 25, Å long.

A suitable polymerizable organic solvent is one which is capable of (i) substantially dissolving the metallopolymer and (ii) undergoing rapid polymerization. Dissolving the metallopolymer results in discrete polymer chains of different length repeat units, not individual metal atoms. A convenient way to identify a polymerizable organic solvent for use with a particular metallopolymer is to first identify a readily available and preferably inexpensive non-polymerizable organic solvent which will dissolve the metallopolymer. Thereafter, a polymerizable analog of the non-polymerizable solvent can be evaluated to see if it too will dissolve the metallopolymer. In such a case, the polymerizable organic solvent will be a modification (derivative) of a conventional non-polymerizable organic solvent. Specific examples of non-polymerizable solvents useful for identifying polymerizable organic solvents include: propylene carbonate, ethylene carbonate, N-methylimidazole, N-methylpyrrolidone, pyridine, dimethyl sulfoxide, acetonitrile, and the like.

The non-polymerizable organic solvent can be made polymerizable by, for example, replacing a C—C— group with a polymerizable vinyl group (C=C—), or the addition of such a vinyl group. The solvent is generally polar and, when modified to be polymerizable, the resulting solvent retains substantially all of its original polarity so that it will remain capable of acting as a ligand and dissolving the metallopolymer.

A polymerizable organic solvent is typically capable of dissolving several metallopolymers, and similarly, each metallopolymer is typically capable of being dissolved in several polymerizable organic solvents and forming a single phase solid with several polymerizable organic solvents. Generally, suitable polymerizable solvents will contain a polymerizable vinyl (C=C—) group. Specific examples of polymerizable organic solvents include: vinylene carbonate, 4-ethenyl-1,3-dioxolan-2-one, (2-oxo-1,3-dioxolan-4-yl)methyl acrylate, (2-oxo-1,3-dioxolan-4-yl) methyl methacrylate, (2-oxo-1,3-dioxolan-4-yl) methyl vinyl ether, N-vinylpyrrolidone, 4-vinyl-pyridine, phenyl vinyl sulfoxide, acrylonitrile, methacrylonitrile, acrylamide, N-vinylimidazole and the like. Most preferably, the polymerizable solvent is vinylene carbonate.

The organic matrices of single phase solids prepared with the metallopolymers typically exhibit properties of the metallopolymers at the molecular level in a homogenous pattern. This is believed due to the metallopolymer's capacity to coordinate with or be solvated by the polymerizable organic solvent, which enables the metallopolymer to be homogeneously dispersed in the resulting solid organic matrix formed after the polymerization of the solvent. Thus the organic matrices of single phase solids made from a solution with a homogeneously distributed metallopolymer exhibit properties of the metal-containing polymeric substances. Single phase materials prepared from $(LiMo_3Se_3)_n$ metallopolymers, for instance, exhibit anisotropic electrical conductivity and linear dichroism.

Alternatively, the single phase may be a homogeneous dispersion of $(LiMo_3Se_3)_n$ units (or other metallopolymer) that have been aligned by shearing or flowing prior to the completion of polymerization. The shearing may be performed prior to polymerization or at some pre-polymer stage before final cure.

Homogeneously dispersed inorganic substance may impart other properties to the solid. The strength and modulus of the organic matrix, for instance, may also be enhanced by the molecular dispersion of a dissolved metallopolymer.

A process for preparing a solution and a single phase solid of the invention is as follows. The preparation of the solution first requires (a) identifying one or more polymerizable solvents that also acts as a ligand for one or more metallopolymers, (b) dissolving the metallopolymer in the polymerizable solvent, (c) stirring the resulting solution so that the dissolved metallopolymer and organic solvent are substantially completely homogeneously and molecularly mixed, and (d) separating any undissolved metallopolymer. Once this solution is prepared, a free radical generator may be added to the solution, dissolved therein, and the solution polymerized into a single phase solid. Alternatively, the free radical generator may be added earlier in the process if the polymerizable organic solvent will not undergo premature polymerization in its presence due to the mixing. Also alternatively, the solution may contain a conventional organic crosslinking agent. This permits reaching the gel point of the system earlier than otherwise would occur and can be useful to prevent any premature phase separation. Suitable such crosslinking agents include tris(2-hydroxyethyl)isocyanate triacrylate, diacrylate compounds, and divinylbenzene.

Generally, the solvent-monomer will not react with the metallopolymer. As such, the dissolution of the metallopolymer will be due to binding or complexation of the monomer for one or more elements of the metallopolymer. Alternatively, the polymerizable organic solvent and metallopolymer may react when mixed. In this case, the solvent-monomer can attach to the metallopolymer as a ligand to form a well-defined chemically bound entity which can later copolymerize with the solvent-monomer.

The identification of suitable metallopolymers and polymerizable organic solvents requires matching a polymerizable organic solvent that acts as a ligand in which the metallopolymer is soluble. The availability, cost, intended use, and the physical properties of the polymerizable solvent after polymerization are some considerations when selecting a particular polymerizable organic solvent.

Once the polymerizable organic solvent and the metallopolymer substance have been identified for a particular system, the metallopolymer is dissolved in the polymerizable organic solvent at any suitable temperature, for example in the range of about 0° to about 60° C., and pressure, commonly atmospheric. The specific amount of dissolved metallopolymer will vary with the particular features of the metallopolymer and the solvent, but substantial changes in the physical characteristics of the polymerized solvent are observed at concentrations of metallopolymer as low as $10^{-5}$ molar (M). As such, the concentration of the dissolved metal cluster will generally will be in the range of about $10^{-5}$M to about 2M, preferably about $10^{-3}$M to about 1M.

Once the polymerizable organic solvent and the metallopolymer have been identified for a particular system, the metallopolymer is dissolved in the polymerizable organic solvent at any suitable temperature, for example in the range of about 0° to about 60° C., and pressure, commonly atmospheric. The specific amount of dissolved metallopolymer will vary with the particular features of the metallopolymer and the solvent, but substantial changes in the physical characteristics of the polymerized solvent are observed at concentrations of metallopolymer as low as $10^{-5}$ molar (M). As such, the concentration of the dissolved metallopolymer will generally will be in the range of about $10^{-5}$M to about 2M, preferably about $10^{-3}$M to about 1M.

When solutions of $(LiMo_3Se_3)_n$ inorganic polymers are dissolved in vinylene carbonate, for instance, at a concentration of about $10^{-3}$M and less, single metallopolymer "wires" about 6 Å in diameter were detectable, while at concentrations of about $10^{-2}$M or higher an ordered nematic liquid crystaline phase formed. $10^{-1}$M is believed to be the solubility limit of $(LiMo_3Se_3)_n$ in polar solvents such as N-methylformamide, propylene carbonate, DMSO, and vinylene carbonate. The viscosity of the solvent affects the duration of the mixing of the solution, so mixing should continue until the dissolved inorganic portions are homogeneously dispersed in the polymerizable organic solvent.

The polymerizable organic solvent may also be capable of mixing with an additional polymerizable organic solvent, and forming a co-polymer with the additional solvent. For example, a mixture of N-vinyl pyrrolidone and vinylene carbonate that dissolves $(LiMo_3Se_3)_n$ can copolymerize. Alternatively, the metallopolymer may be insoluble in the additional polymerizable organic solvent, added in an amount that prevents reaching the respective solubility limit of the metallopolymer. The choice of secondary monomer, if any, will be dictated by considerations such as the desired physical properties of the final solid product, e.g. toughness, elasticity, resistance to U.V. radiation (sunlight), solvent resistance, weathering, and the like.

Polymerization of the polymerizable organic solvent in a homogeneously mixed solution is generally accomplished by the addition of a free radical generator to the solution and the application of heat or ultraviolet light (UV) to decompose the generator into its radical components. A free radical generator such as 2,2'-azobis(isobutyronitrile) (AIBN) or a peroxide such as benzoyl peroxide are typically decomposed thermally while the free radical generator Irgacure-651 (Ciba-Geigy) is decomposed by UV radiation in the range of about 200–380 nm. Since free radical polymerization is well known, further details of alternative generators and operating conditions may be readily found in the literature and thus are not provided here. Depending upon the stability of a system to polymerization, the free radical generator may be added to the polymerizable organic solvent either before or after formation of the polymerizable organic solvent-metallopolymer solution.

The present invention will now be described with reference to the following examples. It is understood that these examples are for illustrative purposes only and should not be deemed as limiting this invention. All parts and percents are by weight unless otherwise stated.

EXAMPLE 1

A nanocomposite containing monodisperse 6Å diameter $(LiMo_3Se_3)_n$ wires was prepared by thermal free-radical polymerization of $10^{-3}$ to $10^{-4}$M vinylene carbonate- $(LiMoBSe_3)_n$ solutions containing 10 wt % tris(2-hydroxyethyl)isocyanate triacrylate and 2 mole % 2,2'-azobis(2,4-dimethylvaleronitrile) at 23°–50° C.

The formation of a single phase solid containing metallopolymer wires was confirmed by scanning transmission electron microscopy (STEM). Aggregation of the nanowires was avoided because the gel point was reached rapidly due to the diluteness of the system and the presence of the crosslinking triacrylate.

EXAMPLE 2

The procedure of Example 1 was repeated except replacing the 2,2'-azobis(2,4-dimethylvaleronitrile) with 5 mole % 2,2-dimethoxy- 2-phenylacetophenone and a 500 Watt Hg lamp. Simliar results were observed.

EXAMPLE 3

A highly oriented nanocomposite containing 20–40 Å diameter multiwire "cables" was prepared in a similar manner to that of Example 1 except that a more concentrated and viscous 0.01 ($10^{-2}$) M solution was used and the solution was sheared between two glass slides during room temperature polymerization. The shearing served to orient the metallopolymer chains while rapid polymerization (5–10 min. under argon) maintained the orientation.

The resulting oriented nanocomposite exhibited significant absorption anisotropy as shown by visible absorbance polarized light microscopy. Spectroscopic ellipsometry conducted on the polarizing films yielded an average dichroic ratio (R) of 2 at 490 nm, where R=absorption parallel/ absorption perpendicular.

STEM analysis revealed an oriented array of 20–40 Å diameter multiwire cables containing 5–20 wires per cable within the polyvinylene carbonate host matrix. A small fraction (2–5%) of undissolved crystallites (100–500 Å) appear to have been insensitive to the shearing forces and remained isotropic. SEM microprobe confirmed that the undissolved crystallites resulted from incomplete exchange of $Li^+$ for $In^+$ during the solid state synthesis of the $(LiMo_3Se_3)_n$.

Chemical association of the Li cations of the $(LiMo_3Se_3)_n$ nanowires with the polyvinylene carbonate host was confirmed by $^{13}C$ cross polarization magic angle spinning NMR spectroscopy.

The conductivity of the multiwires cables was determined to be about $10^2$–$10^3$ S/cm which compares favorably with the reported conductivity of $2\times10^2$ for a neat $(LiMo_3Se_3)_n$ thin film.

What is claimed is:

1. A mixed organic-inorganic solution comprising a homogeneous molecular mixture of a polymerizable organic solvent and an inorganic metallopolymer, wherein the metallopolymer is dissolved in said solvent.

2. The solution of claim 1, wherein the metallopolymer has a high solvation energy to the solvent.

3. The solution of claim 1, further containing a free radical generator.

4. The solution of claim 1, wherein the polymerizable organic solvent contains a polymerizable vinyl group.

5. The solution of claim 1, wherein the polymerizable organic solvent is vinylene carbonate.

6. The solution of claim 1, wherein the metallopolymer is a lithium metallopolymer.

7. The solution of claim 6, wherein the lithium metallopolymer is selected from the group consisting of lithium molybdenum selenide $(LiMo_3Se_3)_n$ and lithium tantalum silicon telluride $(LiTa_4SiTe_4)_n$.

8. The solution of claim 1, wherein the metallopolymer is of the formula $(LiMo_3X_3)_n$ wherein X is selenium or sulfur.

9. The solution of claim 1, wherein the metallopolymer dissolves into discrete units at least about 25 Å long.

10. The solution of claim 1, wherein the polymerizable organic solvent is vinylene carbonate and the metallopolymer is $(LiMo_3Se_3)_n$.

* * * * *

UNITED STATES PATENT AND TRADEMARK OFFICE
CERTIFICATE OF CORRECTION

PATENT NO. : 5,587,422

DATED : Dec. 24, 1996

INVENTORS : Golden et al.

It is certified that errors appear in the above-identified patent and that said Letters Patent is hereby corrected as shown below:

Column 1, line 10: Please insert --This invention was made with government support under Grant No. DMR-9121654 awarded by the National Science Foundation. The government has certain rights in the invention.--

Signed and Sealed this

Tenth Day of February, 1998

Attest:

BRUCE LEHMAN

Attesting Officer

Commissioner of Patents and Trademarks